United States Patent
Liu et al.

(10) Patent No.: US 10,049,306 B2
(45) Date of Patent: Aug. 14, 2018

(54) SYSTEM AND METHOD FOR LEARNING FROM THE IMAGES OF RAW DATA

(71) Applicant: PAYPAL, INC., San Jose, CA (US)

(72) Inventors: Lian Liu, Rosemead, CA (US); Hui-Min Chen, Pleasanton, CA (US)

(73) Assignee: PAYPAL, INC., San Jose, CA (US)

( * ) Notice: Subject to any disclaimer, the term of this patent is extended or adjusted under 35 U.S.C. 154(b) by 56 days.

(21) Appl. No.: 15/393,815

(22) Filed: Dec. 29, 2016

(65) Prior Publication Data

US 2018/0189612 A1    Jul. 5, 2018

(51) Int. Cl.
  *G06K 9/62* (2006.01)
  *G06T 7/00* (2017.01)
  *G06K 9/66* (2006.01)
  *G06Q 20/10* (2012.01)

(52) U.S. Cl.
  CPC .............. *G06K 9/6268* (2013.01); *G06K 9/66* (2013.01); *G06Q 20/10* (2013.01); *G06T 7/0004* (2013.01)

(58) Field of Classification Search
  None
  See application file for complete search history.

(56) References Cited

U.S. PATENT DOCUMENTS

2003/0123721 A1* 7/2003 Megiddo .......... G06F 17/30256
382/159

OTHER PUBLICATIONS

Karthikeyani, "Machine Learning Classification Algorithms to Recognize Chart Types in Portable Document Format (PDF) Files", IJCA 2012.*
Alex Krizhevsky, et al. "Learning Multiple Layers of Features from Tiny Images" [Online] Technical report, University of Toronto, vol. 2. Apr. 8, 2009 [retrieved on Oct. 9, 2017]. Retrieved from the Internet: <URL: https://www.cs.toronto.edu/~kriz/learning-features-2009-Tr.pdf>, Apr. 8, 2009.

\* cited by examiner

*Primary Examiner* — Mark Roz
(74) *Attorney, Agent, or Firm* — Haynes & Boone, LLP

(57) ABSTRACT

Aspects of the present disclosure involve a system and method for learning from images of transactional data. In one embodiment, a system is introduced that can learn from the images of transactional data. In particular, machine learning is implemented on images in order to classify information in a more accurate manner. The images are created from raw data deriving from a user account.

20 Claims, 7 Drawing Sheets

SYSTEM AND METHOD FOR LEARNING FROM THE IMAGES OF RAW DATA

TECHNICAL FIELD

The present disclosure generally relates to communication devices for data classification using machine learning, and more specifically, to communication devices that learn using the images of transaction data.

BACKGROUND

Nowadays merchants, service providers, financial institutions and the like use consumer account data to tailor advertisements, make credit determinations, and determine other relevant information. However, consumer transactions and even payments are often volatile and sparse. Further, the products and services provided by the merchant, service provider, or payment provider may vary widely. For example, a payment provider like PayPal who may have upwards of 200 million active accounts, may have a part of those active accounts belong to causal consumers that make few and infrequent payments. As another example, a consumer with an account at a financial institution may complete transactions using the account at a bakery in the morning and a purchase for tires in the afternoon. These particular traits, where sparse data exists, create significant hurdles in statistical learning-based solutions such as transaction risk models (classification) and abnormality detection models (clustering). This is because the traditional statistical learning algorithms (e.g., linear regression) are less effective in summarizing cases that are abundant in sparse transaction data. Further, current statistical models cannot handle the big data and thus do not converge in a timely manner. Therefore it would be beneficial to create a model that enables the classification of large data using deep machine learning-based techniques.

Figure 1:
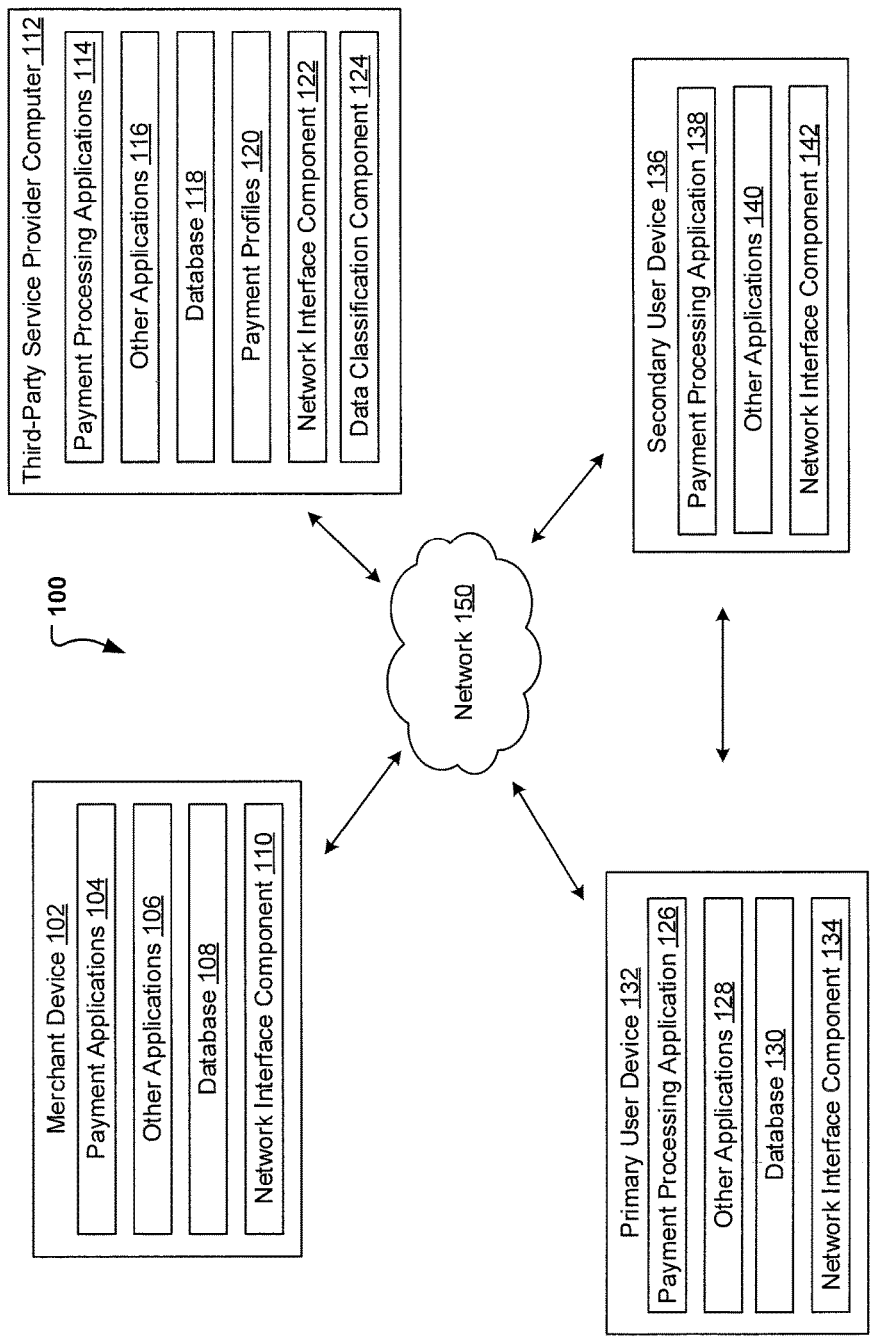
FIG. 1 illustrates a block diagram of a system for classifying and learning from images of transactional data.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for determining information from the images of transactional data. In one embodiment, a system is introduced that can learn from the images of transactional data. In particular, machine learning is implemented on images in order to classify information in a more accurate manner. The images are created from raw data deriving from a user account.

Data gathered by communication devices is now being used to provide tailored advertisements, determined product and services to offer users, and even used to understand the demographics of the consumers. However, the vast amount of information being gathered needs to be organized and categorized in order to obtain the details desired. For example, a financial institution may want to determine what group of customers a new bank card should be advertised to, given that the new card offers loyalty points and comes with an annual fee. To identify the group of customers to advertise the new bank card to, the customer account information needs to be organized and categorized.

Conventionally, statistical learning models have been used to obtain this information. Statistical learning models including clustering and classification models which can provide transaction risk and abnormality detection information have been used. However, in instances where the information is too large and sparse, these models cannot perform effectively. That is to say, with the non-linearities encountered in sparse and volatile data, these conventional algorithms may not converge in a timely manner.

In one embodiment, an image transformation model is introduced that enables the classification of data using image processing which is can accurately classify sparse and volatile date. Using the image transformation model, raw data received can be normalized and mapped/projected to create an image in the form of a polytope. The polytope can then be categorized using image classification techniques such as convolutional neural networks to accurately produce outputs.

FIG. 1 is a block diagram of a networked system 100 for implementing the processes described herein, according to an embodiment. In particular, FIG. 1 illustrates a block diagram of a system 100 for classifying and learning from images of transactional data. As shown, system 100 may include or implement a plurality of devices, computers, servers, and/or software components that operate to perform various methodologies in accordance with the described embodiments. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a merchant device 102, a primary user device 132, a third-party service provider computer 112, and a secondary user device 136 in communication over a network 150. The merchant device 102, primary user device 132, third-party service provider computer 112, and the secondary user device 136 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The merchant device 102 may be implemented as a communication device that may utilize appropriate hardware and software configured for wired and/or wireless communication with the primary user device 132, third-party service provider computer 112, and/or secondary user device 136. For example, the merchant device 102 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 102 may correspond to and be utilized by a user, such as an employee of a merchant and/or another person authorized by the merchant.

The merchant device 102 may include one or more payment applications 104, other applications 106, a database 108, and a network interface component 110. The payment applications 104 and other applications 106 may correspond to executable processes, procedures, and/or applications with associated hardware. In other embodiments, merchant device 102 may include additional or different components having specialized hardware and/or software to perform operations associated with the payment applications 104 and/or the other applications 106.

The payment application 104 may facilitate financial transactions corresponding to the sale of goods and/or services offered by the merchant. For example, the payment application 104 may provide an interface for customers to purchase the goods or services and to receive customer payment information (e.g., customer credit card information). The payment application 104 may further transmit customer payment information to a payment processor (e.g., such as a payment processor corresponding to the third-party service provider computer 112 or the secondary user device 136) to process the customer payment information. The payment application 104 may also facilitate other types of financial transactions such as banking, online payments, money transfer, and/or the like.

The merchant device 102 may execute the other applications 106 to perform various other tasks and/or operations corresponding to the merchant device 102. For example, the other applications 106 may include security applications for implementing client-side security features, programmatic client applications for interfacing with appropriate application programming interfaces (APIs) over network 150, or other types of applications. In various embodiments, the other applications 106 may include social networking applications. Additionally, the other applications 106 may include device interfaces and other display modules that may receive input and/or output information. For example, the other applications 106 may include a graphical user interface (GUI) configured to provide an interface to the user.

The merchant device 102 may further include a database 108, which may be stored in a memory and/or other storage device of the merchant device 102. The database 108 may include, for example, identifiers (IDs) such as operating system registry entries, cookies associated with the payment application 104 and/or other applications 106, IDs associated with hardware of the network interface component 110, IDs used for payment/user/device authentication or identification, and/or other appropriate IDs. The database 108 may also include information corresponding to one or purchase transactions of customers who have purchased goods or services from the merchant, browsing histories of the customers, or other types of customer information. In certain embodiments, the merchant device 102 may also include information corresponding to payment tokens, such as payment tokens generated by the third-party service provider computer 112 and/or generated by the secondary user device 136.

The merchant device 102 may also include at least one network interface component 110 configured to communicate with various other devices such as the primary user device 132, the third-party service provider computer 112, and/or the secondary user device 136. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 112 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 112 may be associated with a user of the primary and secondary device 132, 136. As such, the third-party service provider computer 112 includes one or more payment processing applications 114, which may be configured to process payment information received from the merchant device 102 or from a selection at the primary or secondary user device 132, 136. For example, the payment application 104 of the merchant device 102 may receive payment information from a customer to purchase a service or good offered by the merchant. Upon receipt of the payment information, the payment application 104 may transmit the payment information to the third-party service provider computer 112. The payment processing application 114 of the third-party service provider computer 112 may receive and process the payment information. As another example, the payment application 104 can present a payment code on a display of the user device associated with the merchant The payment code can be scanned or transmitted to the merchant device 102 for payment processing.

The third-party service provider computer 112 may execute the other applications 116 to perform various other tasks and/or operations corresponding to the third-party service provider computer 112. For example, the other applications 116 may include security applications for implementing client-side security features, programmatic client applications for interfacing with appropriate APIs over the network 150, or other types of applications. The other applications 116 may also include additional communication applications, such as email, texting, voice, and IM applications that enable communication of emails, calls, texts, and other notifications through the network 150. In various embodiments, the other applications 116 may include location detection applications, such as a mapping, compass, and/or GPS applications, which may be used to determine a location of the third-party service provider computer 112. Additionally, the other applications 116 may include device interfaces and other display modules that may receive input and/or output information. For example, the other applications 116 may include a GUI configured to provide an interface to one or more users.

The third-party service provider computer 112 may further include a database 118, which may be stored in a memory and/or other storage device of the third-party service provider computer 112. The database 118 may include, for example, IDs such as operating system registry entries, cookies associated with the payment processing application 114 and/or other the applications 116, IDs associated with hardware of the network interface component 122, IDs used for payment/user/device authentication or identification, and/or other appropriate IDs.

According to a particular embodiment, the third-party service provider computer 112 may include a set of payment profiles 120 corresponding to past sales transactions executed by the merchant device 102 with respect to one or more customers of the merchant. Alternatively, the third-party service provider computer 112 may include a set of merchant payment profiles corresponding to the payment sources associated to a corresponding merchant. For example, a particular payment profile from the set of payment profiles 120 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 120 may include payment information corresponding to other customers of the merchant and/or other merchants associated with the user. In addition, the third-party service provider computer 112 may store the set of payment profiles 120 according to a first file format.

The third-party service provider computer 112 may also store a set of payment tokens corresponding to the set of payment profiles 120. For example, each payment profile of the set of payment profiles 120 may be associated with a corresponding payment token from the set of payment tokens. In some embodiments, each payment profile may include a corresponding payment token from the set of payment tokens. The set of payment tokens may be particular to the third-party service provider computer 112 (e.g., computers from other service providers may be unable to use the set of payment tokens) and may enable the merchant device 102 to more securely process payment transactions with the third-party service provider computer 112. For example, in order to process a payment transaction that involves a credit card number associated with a particular payment profile, the third-party service provider computer 112 may provide the merchant device 102 with a particular payment token that is different from the credit card number. The merchant device 102 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 102.

In various embodiments, the third-party service provider computer 112 also includes at least one network interface component 122 that is configured to communicate with the merchant device 102, the primary user device 132, and/or the secondary user device 136 via the network 150.

The third party provider computer 112, may also include a data classification component 124 that may be used for raw data classification. In one embodiment, the raw data received by the third-party service provider computer 112 and/or stored in database 118 can be analyzed to identify correlations in the data. For the analysis, the raw data can be converted into images that may be used in conjunction with image classification techniques for identifying the correlations. In some instances, the raw data may derive from user transactions and account information received at a merchant device 102, with a financial institution, a payment provider, at a secondary user device 136, at a primary user device 132, etc. As an example, raw data/information can be extracted from the user accounts stored in database 118 at a third-party service provider computer (e.g., PayPal). The user account information can be used for example, to identify high risk customers vs. low risk customers. For the identification, relevant account information (e.g., credit score, user name, etc.) for each customer can be mapped to an image.

Alternatively, the entire account information of the customer can be mapped to an image. Image mapping can occur using a data transformation technique that maps customer features onto a circle to create a polytope. The image can then be analyzed using image classification techniques such that the output of the image classification provides the data required to determine whether the customer associated with the account information analyzed is a high risk or a low risk customer. Note, further details on transformation and classification will be described in more detail below and in conjunction with FIGS. 3A-3D and 4. In addition, the data classification component 124 may also be implemented at the merchant device 102, primary user device 132, and secondary user device 136 for learning and identifying information. In some instances, consumer information may be shared between the devices 102, 124, 132, 136 for classifying and converting the transactional data.

The primary user device 132 may be implemented as a communication device that may utilize appropriate hardware and software configured for wired and/or wireless communication with the merchant device 102, third-party service provider computer 112, and/or the secondary user device 136. The primary user device 132, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 132 may be mobile device communicating with wearable device (secondary user device 136), merchant device 102, or directly with the third-party service provider system 112.

The primary user device 132 may include a payment processing application 126 that may be used as a digital wallet that can communicate with a merchant device 102, secondary user device 136, and/or third party service provider 112 for purchasing and transacting. The payment processing application 126, can work jointly with database 130 for retrieving bank account information, user accounts, security codes, tokens that may be associated with various merchant locations. Similarly, the payment processing application, can also provide access the user profiles for determining which payment method, processing code, to use at a merchant location.

The primary user device 132 may also include other applications 128 to perform various other tasks and/or operations corresponding to the primary user device 132. For example, the other applications 128 may facilitate communication with the merchant device 102, such as to receive an indication, from the merchant device 102, to switch payment processing services from the third-party service provider to the service provider. As another example, the other applications 128 may include security applications, application that enable designation of a primary interactive device, and applications that allow for web site searches (including access to merchant websites). The other applications 128 may also include additional communication applications, such as email, texting, voice, and IM applications that enable communication of emails, calls, texts, and other notifications through the network 150. In various embodiments, the other applications 128 may include location detection applications, such as a mapping, compass, and/or GPS applications, which may be used to determine a location of the primary user device 132. The other applications 128 may include social networking applications. Additionally, the other applications 128 may include device interfaces and other display modules that may receive input and/or output information. For example, the other applications 128 may include a GUI configured to provide an interface to one or more users.

The primary user device 132 may further include a database 130, which may be stored in a memory and/or other storage device of the primary user device 132. The database 130 may include, for example, identifiers (IDs) such as operating system registry entries, cookies associated with a web browser and/or the other applications 128, IDs associated with hardware of the network interface component 134, IDs used for payment/user/device authentication or identification, bank information, merchant information, user accounts, and/or other appropriate IDs.

The primary user device 132 may also include at least one network interface component 134 configured to communicate with various other devices such as the merchant device 202, the third-party service provider computer 112, and/or the secondary user device 136.

As indicated above, a secondary user device 136 may be presently available and used by a consumer. The secondary user device 136, much like the primary user device may be equipped with payment processing applications 138 as well as other applications 140. The payment processing applications 138 and other applications 140 that include social networking applications and device interfaces and other display modules that may receive input and/or output information.

The secondary user device 136 may also include a network interface component 142 for connecting and interacting with at least primary user device 132, merchant device 102, and/or third-party service provider computer 112 over network 150.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
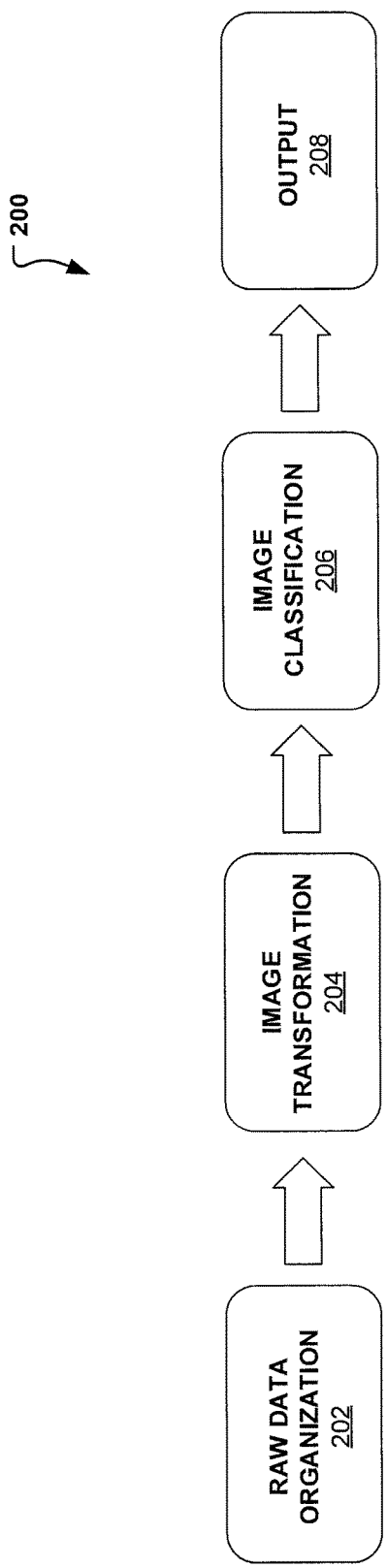
FIG. 2 illustrates a block diagram of a system for the overall process in classifying and learning from images of transactional data.

FIG. 2 illustrates a block diagram of a system for the overall methodology in classifying and learning from images of transactional data. In particular, FIG. 2 illustrates a block diagram of a methodology 200 for converting raw data into images and then classifying or clustering the images to obtain information from the raw data received. The methodology 200 for classifying information begins with the raw data 202. As previously indicated and with reference to the third-party service provider computer 112, a payment provider will be used for exemplary purposes. The payment provider has many customer accounts which contain a vast amount of information about the customer. In the data classification process, each customer may be represented by a sequence of data/features. For example, the customer account may have information about the customer including age, zip code, transaction history, credit score, etc. This information may be represented as a feature associated with each of the customers. So that the raw data can, for example, be organized as an N×K matrix in which every row represents an account with a financial institution or a consumer transaction and each column represents the corresponding K features associated with each of the N accounts/customers/transactions associated with the accounts.

The organized data is then input into image transformation unit 204 that can convert the raw input data into images. The image transformation unit 204 can process the raw data on a row-by-row basis such that each customer account is represented by an image. Therefore, up to N images can be output from the image transformation unit 204. The images can then be analyzed by image classification unit 206 so that relevant information can be extracted from the features of the various customers. For example, as part of a marketing campaign, a payment provider would like to determine which users are over 50 years old and have made over 100 purchases in the last year with a specific merchant. The classified image information can provide such information by presenting those images that fit the criteria. Alternatively, the desired criteria can be identified during the image transformation such that output 208 from the image classification unit 206 are those images that match the criteria. Image classification can occur one of the various machine learning models available. For example, transactional risk models and clustering models have been previously used. In one embodiment, a convolutional model, such as a convolutional neural network model is used.

Note that various other implementations of the image transformation and classification may be contemplated. FIG. 2 illustrates but one example of data transformation for simplicity.

Figure 3A:
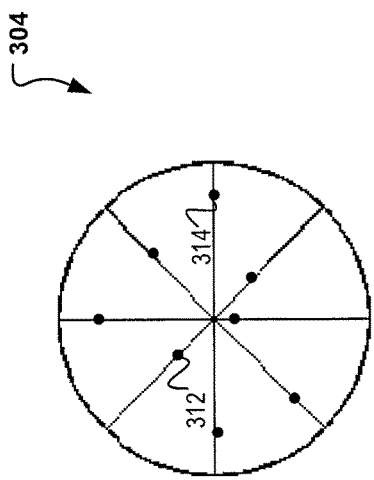
FIGS. 3A-3D illustrate a graphical diagram of a system for converting raw transactional data into an image.

FIGS. 3A-3D illustrate a graphical diagram of a system for converting raw data into an image. In particular, FIGS. 3A-3D illustrate a methodology for generating images from the raw data. As indicated above, each customer may be represented by an image and each customer account may include various features that describe the customer. Therefore, to begin with the transformation, the features are mapped to a circle, which is used to create a polygon representing the raw data as an image. FIG. 3A begins with circle 300, which represents the customer. The circle can then be divided into radii 310, where each radius 310 represents a feature. Note that in some instances, all customer features may be mapped on the image, while in other instances, a lesser and more relevant number of features are mapped.

Therefore, a customer u (represented by circle 300) may have k features (each represented by a radius 310), such that the circle 300 is divided into k partitions. FIG. 3A illustrates a circle 300 with k=8 partitions. To provide an illustration of how this would map to a customer, assume a payment provider has John as a customer. John's account with the payment provider may include user identification features including, but not limited to, John's age, zipcode, credit score, and purchase history. Therefore, if John's raw information was mapped to a circle u, John's circle would include 4 equally spaced partitions created by the 4 radii, where each radius would represent a feature (e.g., age, zipcode, credit score, purchase history).

Figure 3B:
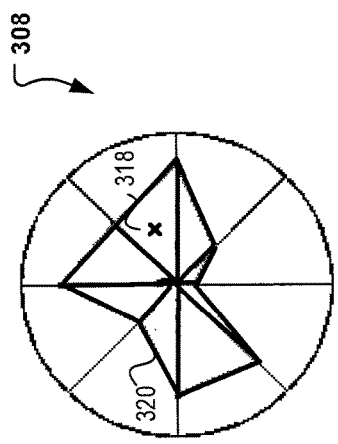

Once, the customer circle 300 has been partitioned, each feature is normalized to fit on the unit circle 300, where the origin is 0 and the circumference of the circle 300 is 1 as illustrated in FIG. 3B. For example, returning to John's example, if John is 50 years old, and the ages of customers are considered to lie between 0 and 150 year old, then John's age could be normalized to a ⅓ value. Therefore, one of the radii 310 representing age could be used to describe the age feature. For example, John's age (normalized to ⅓) can be projected onto the age radius, denoted by unit 312, which lies about a ⅓ of the way from the center. Similarly, another feature which lies about ⅔ of the way from the center after being normalized can be projected onto the corresponding feature radius using unit 314.

This process can be generalized for any application such that the mapping can be generally described as having a set of n instances $\{I_1, I_2, \ldots I_3\}$, each having k variables ($v_{i,1}$, $v_{i,2}, \ldots v_{i,k}$), $1 \leq i \leq n$. The variables (e.g., features) can be normalize such that $v_{i,j} \in [0,1]$ for $1 \leq i \leq n$ and $1 \leq j \leq k$. For numerical variables such as transaction amount, transaction velocity, account days on file and payment history, the normalization process may be straight forward. However, an appropriate treatment of the missing values is desired to ensure data integrity. For categorical variables such as consumer primary residence, account type, geolocation, and product category, the value of such numbers (e.g., {0, 1, 2 . . . } may be mapped based on the alphabetical ordering of the values before performing the normalization. For example, for the product color variable taking values from "black", "blue", "green", and "grey", the values may be normalized to {0, ⅓, ⅔, 1} respectively. The closer a variable is to zero, the closer the point is to the center.

Figure 3C:
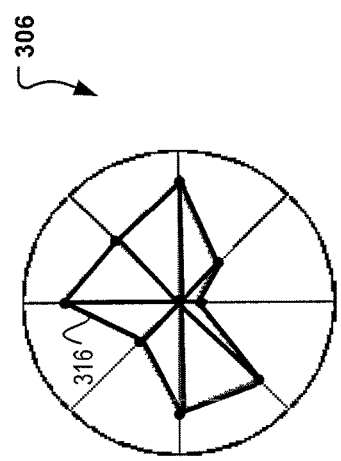
Figure 3D:
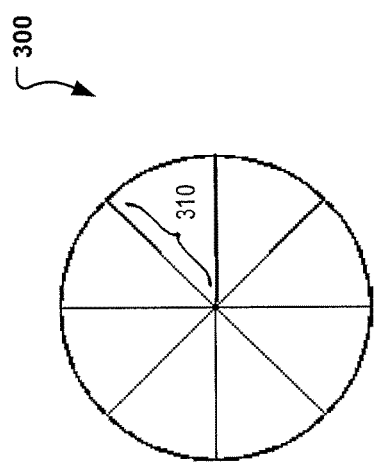

Once the points (e.g., units representing the features) have all been identified on the radius of the circle, the center of the circle and each pair of adjacent points may be connected to each of the points in order to form a polygon 316 as illustrated in FIG. 3C. The polygon 316 as illustrated in FIG. 3C becomes an image representation of the raw data.

To determine what a particular value of a pixel 318 on the polygon 316, the polygon 316 is converted into a three dimensional (3D) polytope 308. For the conversion, the center of the polygon is given a height of 1, while the boundaries of the polygon lie at zero. A polytope is a geometric object with flat sides and the grey scale value of a pixel can be represented using the polytope of FIG. 3D. By regarding the polygon as a 3-D object, a point of interest (represented by pixel at point 318) can be determined by drawing a vertical line on the projected point. For simplicity, the 3D polytope 308 can represent a triangle which has an edge on the paper and the center point on the polygon center.

Figure 4:
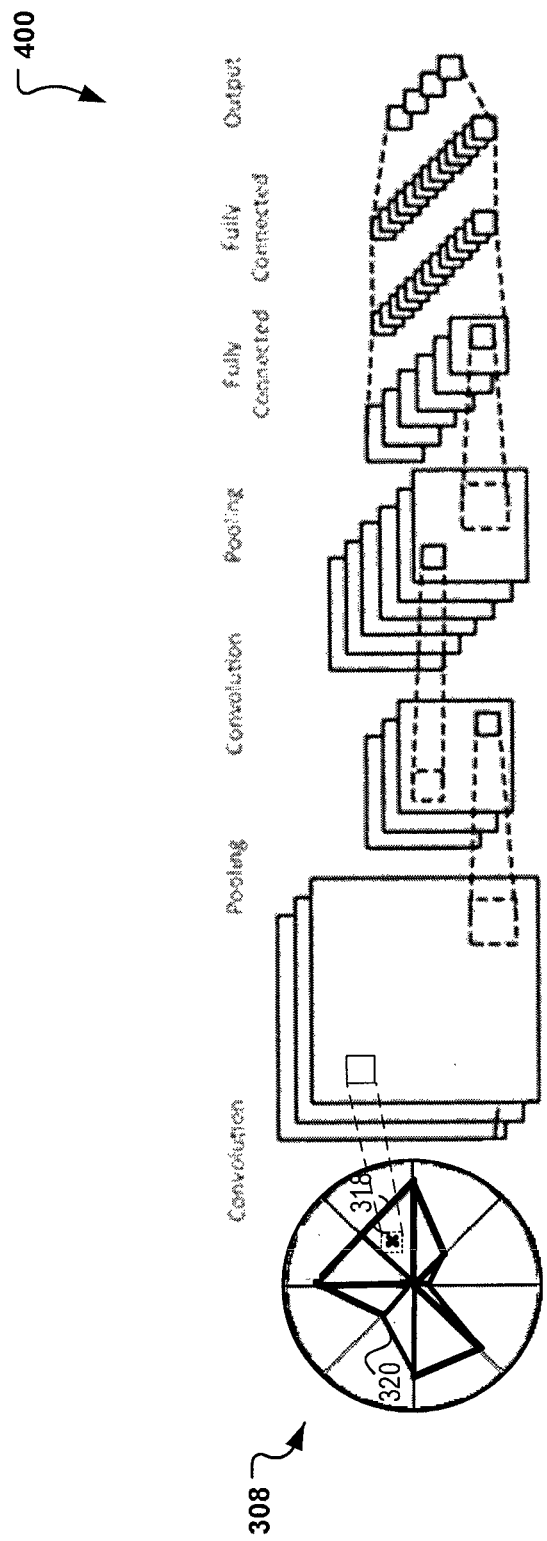
FIG. 4 illustrates a block diagram of a system for image classification.

As indicated in FIG. 2, once raw data has been transformed into an image, the image may be classified to extract correlations that can be achieved with high precision. FIG. 4 illustrates a block diagram of a system for image classification. The intent of image classification is to categorize all pixels into several classes such that all pixels fall into or may be represented by a class. The classes can be used to produce a map of the land covered by the image. The objective is to identify the type of land covered by the greyscale pixel.

Generally, deep machine learning algorithms can be used to perform this categorization of pixels. In image processing, modern image recognition models such as convolutional neural networks (CNNs, ConvNet, LeNet, etc) have be used. FIG. 4, illustrates an exemplary image classification that may be used on polytope 320. Image processing algorithms or software that may be included in data classification component 124 can identify classes of interest in the polytope image 308. In some instances, a Cifar-10 dataset may be used for object recognition, which has been recognized to achieve rates upwards of 95.53% over 10 classes. Therefore, pixel 318 can be represented by a class by iterating and comparing the pixel grey value signature to land signatures/classes that produce the map the cover the image (e.g., polytope 320). As illustrated, the classification can occur over numerous iterations that include the convolution and pooling of the data until all pixels are classified and the desired output is acquired.

Note that in some instances, in image processing in order to obtain more accurate results, it may be useful to increase resolution. Higher image resolution leads can lead to a higher demand on computational power and storage space. Therefore, in one embodiment, the features/variables can be mapped to a logarithmic space after normalizing. In some instances, normalizing multiple times can provide an improved image resolution (e.g., improve polytope shape) such that more accurate results may be achieved. In other embodiments, the features/variables can be mapped to an exponential space after normalizing. Therefore, after the raw data is gathered and organized as illustrated in FIG. 2, the data may be organized, mapped and then normalized again to achieve an increase image resolution.

Figure 5:
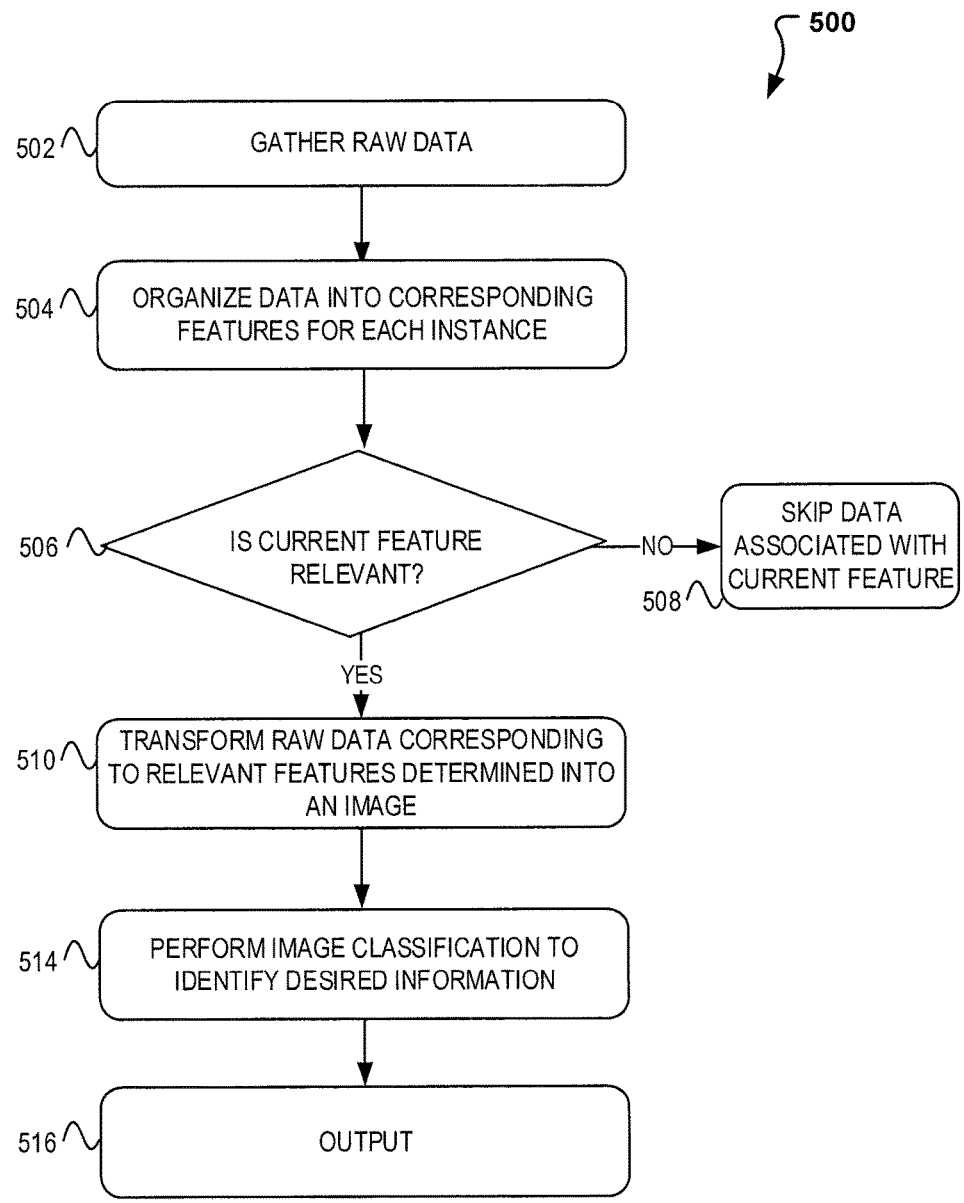
FIG. 5 illustrates a flow diagram illustrating operations for classifying and learning from images of transactional data.

FIG. 5 illustrates example process 500 for classifying and learning from images of transaction data that may be implemented by a system, such as system 100 of FIG. 1. In particular, FIG. 5 illustrates a flow diagram illustrating operations for learning from images of raw data. According to some embodiments, process 500 may include one or more of operations 502-514, which may be implemented, at least in part, in the form of executable code stored on a non-transitory, tangible, machine readable media that, when run on one or more hardware processors, may cause a system to perform one or more of the operations 502-514.

Process 500 may begin with operation 502, where raw data is gathered. The raw data gather will be transformed to enable classification and statistical modeling with high precision. The raw data can originate from any information gathering mechanisms that collect data for the purpose of making correlations or learning from the information. For example, the raw data can derive from sensors on an automobile used for autonomous driving, raw data can originate from crowdsourced information that is received for testing a new product/application or the raw data can originate from users inputting information when creating a user account. Note that numerous other sources of data exist and may be contemplated.

In one embodiment, the raw data can be collected from user accounts associated with a financial institution, service provider, and/or payment provider. The raw data can correspond to the user information associated with the account. For example, a user may have an account with a service provider and the raw data for that account may include zip code, purchase history, credit score, account number, etc.

Once the information or raw data has been gathered, the process continues to operation 504, where the data is organized in matrix form. For example, the data can be organized such that instances (e.g., customers/user accounts) are organized into N rows and the corresponding features (e.g., account information) are organized into K columns, creating an N×K matrix of information. The organization of the raw data in this format, allows for individual instances or user accounts to be transformed, classified, and analyzed. For example, in process 500, the organized data arriving at decision block 506 for determining relevant features can be on a row-by-row basis, such that a single account is analyzed at a time. Alternatively, all raw data can be manipulated simultaneously.

In addition, some or all relevant features may be selected for analyzing to obtain the information desired in operation 506. For example, if a payment provider is trying to understand the demographics of its account holders in terms of how many fall within a given age group and have a credit score above a predetermined value, then zip codes of each account holder example may not be that relevant. Alternatively, if the information desired includes identifying those customers above a given age group, a credit score, and further the geography of those customers, then zip codes as well as other features may be relevant in the analysis. Therefore, in operation 506 a determination is made as to whether the current feature is needed. If the feature is relevant, then the process can continue to operation 510 where the data associated with the relevant feature(s) is transformed into an image in operation 510. However, if the feature (e.g., date of last purchase) is not relevant, then process continues to operation 508 where the feature is skipped. Note that each feature may be considered by the decision block in operation 506 until all features associated with the current customer account have been considered.

Once the data corresponding to the relevant features has been determined, process 500 continues to operation 510 where the raw data is transformed into an image. In operation 510, a model is introduced that can take the raw data gathered and transform it into another dimension (e.g. an image) which can leverage deep machine learning technology to provide more detailed information. Deep machine learning technology implements techniques that allow the data to be seen and analyzed from a different prospective. By converting raw data into images, image classification techniques can be used that allow the classification of information that is not possible by other models. For example, transactional data can be highly volatile and not uniformly distributed, as such, conventional statistical learning-based solutions (e.g., transaction risk models—classification, abnormality detection-cluster) are less effective in summarizing the transactional data.

In one embodiment, an image transformation model is introduced that utilizes the power of image processing, computer vision, and GPU computing techniques to obtain highly accurate output predictions. Generally, the higher image resolution the more accurate the results. In particular, this model as described in greater detail above and in conjunction with FIG. 3, transforms the raw data received into an image by mapping the raw data onto a circle.

Mapping the raw data onto a circle may be accomplished by normalizing the features (e.g., $v_{i,j} \in [0,1]$ for $1 \leq i \leq n$) identified in operation 506 such that they can be represented by a radius on the circle enables the representation of the relevant features on the circle. For example, a credit scores can range between 500-850 and a 750 credit score is to be mapped on the unit circle. The credit score can be represented such that the center of the circle is 500 and the perimeter of the circle is 850, thus 750 would be mapped about 0.71 (e.g., ((750-500)/(850-500))) from the center. This process continues until the relevant features are mapped as a corresponding unit. Once the raw data has been represented as units on the circle, the units are connected to create a polygon. The closer the feature lies to zero, the close it is to the center of the circle. Alternatively, the further from the center, the further the feature is from zero and closer to unity. Next, in order to determine what a particular value of a pixel on the polygon, the polygon is converted into a three dimensional (3D) polytope. For the conversion, the center of the polygon is given a height of 1, while the boundaries of the polygon lie at zero.

Once an image representation of the raw data is achieved, then process 500 continues to the image classification in operation 514. Image classification enables the identification of the information desired, that may otherwise not be captured by optimization-based conventional algorithms due to the non-linearities in the information. Instead, an image classification technique such as conventional neural networks can be used which can provide high accuracy. For example, Cifar-10, Mixed National Institute of Standards and Technology (MNIST), NORB, HWDB1.0, ImageNet, etc. datasets may be used. As indicated, CIFAR-10 is an established computer-vision dataset used for object recognition which is a Cifar-10 has achieved an accuracy rate of 95.53% over 10 classes. As indicated in FIG. 4, image classification categorizes pixels into classes, such that all pixels fall into a class. The classes can be used to produce a map of the land covered by the image with the objective being that a type of land is identified for each greyscale pixel. Once the image classification is complete, the process concludes with an output of the desired information.

Figure 7:
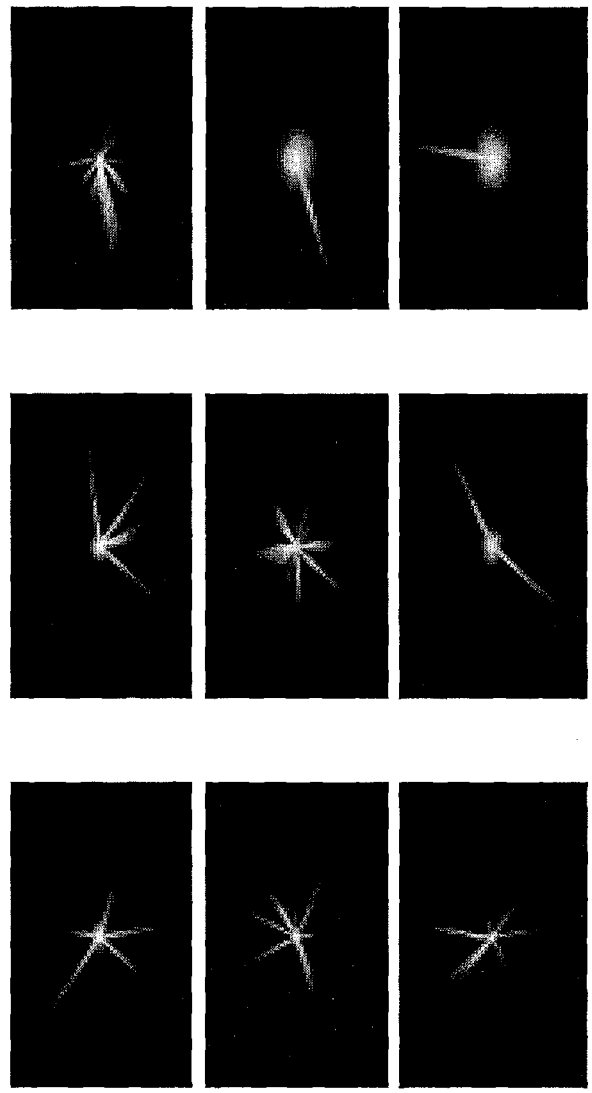
FIG. 7 illustrates exemplary output data using the communication systems of FIGS. 1-6.

To ensure correct functionality of the data transformation model presented as well as the image classification method proposed methodology was tested on a classification problem with 50,000 instances (e.g., consumer accounts) with two years of transactional history data. The goal of the classification was to separate high credit risk account from the rest of the population. The experiment was conducted over a 120 hour period using a GeFroces GTX 780 (e.g., Nvidia GPU) machine running a Linux OS. The results, as illustrated in FIG. 7, provided proof of concept as the images associated with high credit risk were distinguished from the other accounts. In particular, FIG. 7 illustrates exemplary images derived for customers with bad credit. In addition, the system also provided numeric scores as widely used by risk models. Note that this type of classification would not be possible using conventional models due to the non-linearities in the data and the extent of information as conventional algorithms can manage data volumes normally under 1 MM rows with hundreds of variables at most.

Figure 6:
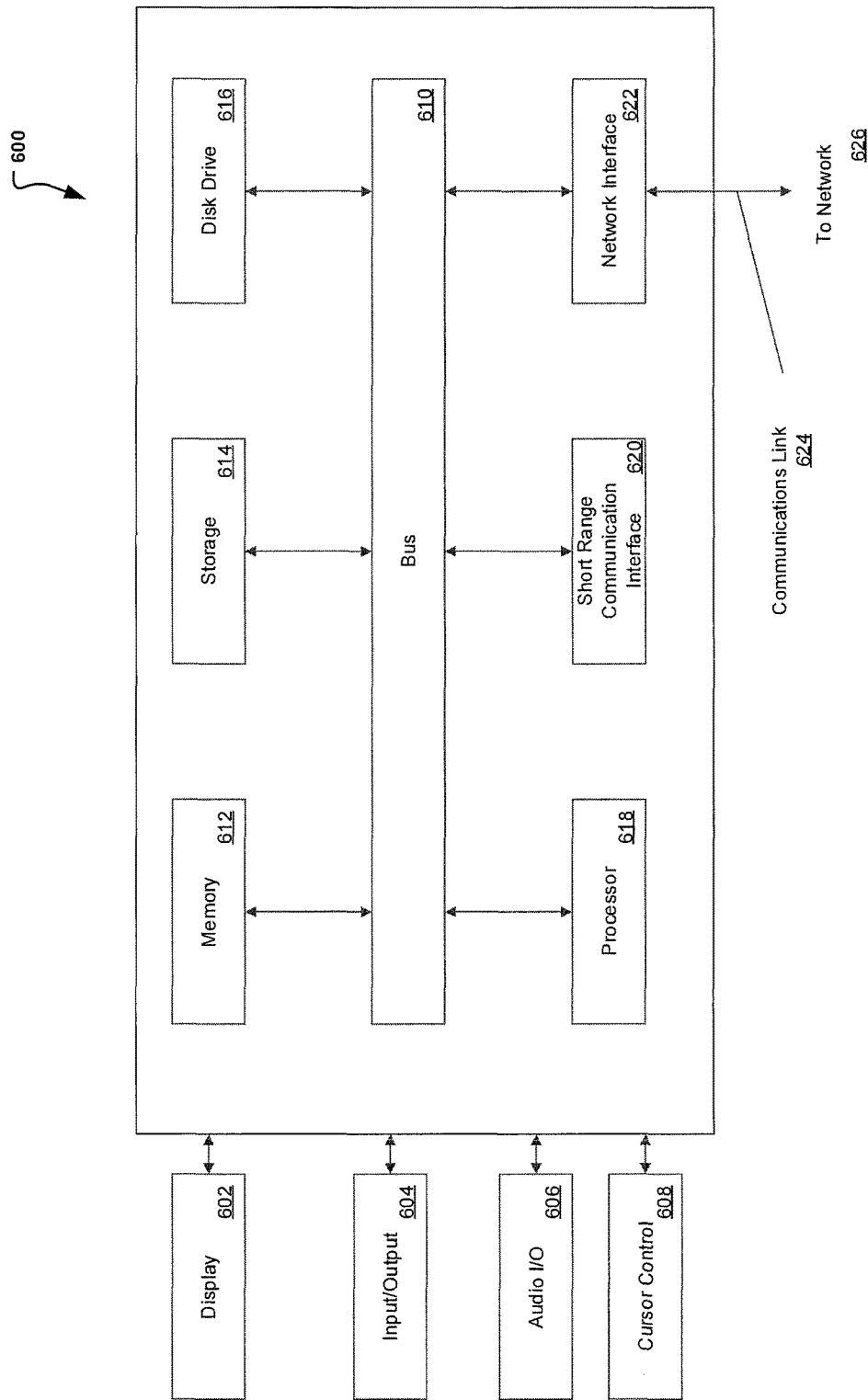
FIG. 6 illustrates an example block diagram of a computer system suitable for implementing one or more devices of the communication systems of FIGS. 1-5.

FIG. 6 illustrates an example computer system 600 in block diagram format suitable for implementing on one or more devices of the system in FIG. 1. In various implementations, a device that includes computer system 600 may comprise a personal computing device (e.g., a smart or mobile device, a computing tablet, a personal computer, laptop, wearable device, PDA, etc.) that is capable of communicating with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 may include an image sensor for capturing images and/or video, such as a complementary metal oxide semiconductor (CMOS) image sensor, and/or the like. An audio input/output component 606 may also be included to allow a user to use voice for inputting information by converting audio signals. Audio I/O component 606 may allow the user to hear audio. A transceiver or network interface 622 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612. Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., primary user device 132, secondary user device 136, merchant device 102, etc.) with short range communications technology near computer system 600. Short range communications interface 620 may create a communication area for detecting other devices with short range communication capabilities. When other devices with short range communications capabilities are placed in the communication area of short range communications interface 620, short range communications interface 620 may detect the other devices and exchange data with the other devices. Short range communications interface 620 may receive identifier data packets from the other devices when in sufficiently close proximity The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising
a non-transitory memory storing instructions;
a processor configured to execute the instructions to cause the system to:
 access raw data associated with a plurality of user accounts for determining an information type;
 organize the raw data into organized raw data to arrange, in a matrix form, instances of user accounts and corresponding features;
 analyze organized raw data to determine a normalizing technique, the normalizing technique based on a resolution level;
 map each instance of user accounts to an image on a circle, the mapping including linking projected normalized features on the circle to generate the image; and
 in response to the generating of the image, perform image classification of the image for the determining of the information type.

2. The system of claim 1, wherein the mapping further includes normalizing each feature associated with the each instance of the user accounts using the normalizing technique.

3. The system of claim 2, wherein executing the instructions further cause the system to, in response to normalizing the each feature, project the each normalized feature onto the circle.

4. The system of claim 1, wherein the normalizing technique maps the features to a logarithmic space.

5. The system of claim 1, wherein the image generated is converted into a three dimensional polytope.

6. The system of claim 1, wherein the performing image classification includes representing a pixel on the image to a class in a plurality of classes, wherein the plurality of classes produce a map that covers the image generated.

7. The system of claim 1, wherein the raw data is accessed from a database associated with a payment provider.

8. The system of claim 1, wherein the raw data includes user account information associated with a user of a payment provider.

9. A method for learning from an image, the method comprising:
 accessing raw data associated with a plurality of user accounts for determining an information type;
 organizing the raw into organized raw data to arrange in matrix form, instances of user accounts and corresponding features;
 analyzing organized raw data to determine a normalizing technique, the normalizing technique based on a resolution level;
 mapping each instance of user accounts to the image on a circle, the mapping including linking projected normalized features on the circle to generate the image; and
 in response to the generating of the image, performing image classification of the image for the determining of the information type.

10. The method of claim 9, wherein the mapping further includes normalizing each feature associated with the each instance of the user accounts using the normalizing technique.

11. The method of claim 10, wherein in response to normalizing the each feature, projecting the each normalized feature onto the circle.

12. The method of claim 9, wherein the normalizing technique maps the features to a logarithmic space.

13. The method of claim 9, wherein the image generated is converted into at least one of a three dimensional polytope and a two dimensional polygon.

14. The method of claim 9, wherein performing image classification includes mapping a pixel on the image to a class in a plurality of classes, wherein the plurality of classes produce a map that covers the image generated.

15. The method of claim 9, wherein the raw data is accessed from a database associated with a payment provider.

16. The method of claim 9, wherein the raw data includes user account information associated with a user of a payment provider.

17. A non-transitory machine readable medium having stored thereon machine readable instructions executable to cause a machine to perform operations comprising:
 accessing raw data associated with a plurality of user accounts for determining an information type;
 organizing the raw data into organized raw data to arrange in a matrix form, instances of user accounts and corresponding features are arranged in a matrix form;
 analyzing organized raw data to determine a normalizing technique, the normalizing technique based on a resolution level;

mapping each instance of user accounts to an image on a circle, the mapping including linking projected normalized features on the circle to generate the image; and in response to the generating of the image, performing image classification of the image for the determining of the information type.

18. The non-transitory machine readable medium of claim 17, wherein the mapping further includes normalizing each feature associated with the each instance of the user accounts using the normalizing technique.

19. The non-transitory machine readable medium of claim 18, wherein the operations further comprise, in response to normalizing the each feature, projecting the each normalized feature onto the circle.

20. The non-transitory machine readable medium of claim 19, wherein the normalizing technique maps the features to a logarithmic space.

* * * * *